United States Patent [19]
Cann et al.

[11] Patent Number: 4,670,526
[45] Date of Patent: Jun. 2, 1987

[54] PROCESS FOR ACTIVATION OF TITANIUM AND VANADIUM CATALYSTS USEFUL IN ETHYLENE POLYMERIZATION

[75] Inventors: Kevin J. Cann, Belle Mead, N.J.; David L. Miles, Chapel Hill, N.C.; Frederick J. Karol, Belle Mead, N.J.

[73] Assignee: Union Carbide Corporation, Danbury, Conn.

[21] Appl. No.: 833,148

[22] Filed: Feb. 27, 1986

[51] Int. Cl.$^4$ .............................. C08F 4/64; C08F 4/68
[52] U.S. Cl. .................................. 526/125; 526/348.2; 526/352
[58] Field of Search ......................................... 526/125

[56] References Cited
U.S. PATENT DOCUMENTS 3,412,174 11/1968 Kroll .............................. 502/117 X
4,250,285 2/1981 Minami et al. ...................... 526/125
4,370,455 1/1983 Veda et al. .......................... 526/125

Primary Examiner—Patrick P. Garvin
Attorney, Agent, or Firm—Saul R. Bresch

[57] ABSTRACT

A process for activating a titanium or vanadium compound and producing polyethylene comprising (i) dissolving a divalent magnesium halide and a Lewis acid having the formula $R_mAlX_n$ or $R_mBX_n$ wherein R is an alkyl or aromatic radical, each radical having 1 to 12 carbon atoms and each R being alike or different; X is a halogen atom; m is an integer from 0 to 3; n is an integer from 0 to 3; and m+n equals 3, in an excess of electron donor compound selected from the group consisting of alkyl esters of alkyl and aromatic carboxylic acids and alkyl and cycloalkyl ethers, each compound having 2 to 12 carbon atoms, in such a manner that a magnesium halide/Lewis acid/electron donor complex is formed; (ii) separating the complex from excess electron donor compound; and (iii) introducing (a) the complex, the titanium or vanadium compound, and a hydrocarbyl aluminum compound and (b) ethylene into a reactor in such a manner that the titanium or vanadium compound is activated and polyethylene is produced.

4 Claims, No Drawings 4,670,526

PROCESS FOR ACTIVATION OF TITANIUM AND VANADIUM CATALYSTS USEFUL IN ETHYLENE POLYMERIZATION

TECHNICAL FIELD

This invention relates to a process for the activation of an ethylene polymerization catalyst, and an activator therefor.

BACKGROUND ART

A typical ethylene polymerization catalyst is prepared by forming a precursor from a magnesium compound, a titanium compound, and an electron donor compound; diluting the precursor with an inert carrier material; and activating the precursor by introducing an organoaluminum compound. The process is described in U.S. Pat. Nos. 4,302,565; 4,302,566; and 4,303,771, incorporated by reference herein. The magnesium and titanium compounds are dissolved in the electron donor compound (solvent) at a temperature ranging from ambient to below the boiling point of the electron donor. The order of addition to the electron donor compound is not important to the result, i.e., one or the other of the magnesium and titanium compounds can be added first or they can be added together. The dissolution in the electron donor compound can be enhanced by slurrying or refluxing. After the magnesium and titanium compounds are dissolved, the resulting product is isolated by crystallization or precipitation with a hydrocarbon such as hexane, isopentane, or benzene. The crystallized or precipitated product is dried and recovered as fine, free-flowing particles. The magnesium/titanium based composition is then mixed with, or impregnated into, an inert carrier material. The carrier is generally a solid, particulate, porous material such as silica.

In order for the magnesium/titanium based composition to be useful as a polymerization catalyst, it must be activated with a compound capable of transforming the magnesium/titanium atoms to a state which will effect the desired polymerization reaction. Activation is accomplished by the addition of an organoaluminum compound. Partial activation, if desired, is effected outside of the polymerization reactor by introducing the catalyst composition and the organoaluminum into a solvent. Complete activation is then carried out in the reactor as described in U.S. Pat. No. 4,383,095, incorporated by reference herein.

While the magnesium/titanium based catalyst compositions have proved to be satisfactory ethylene polymerization catalysts, there is a continuing effort to improve on the catalysis aspect of ethylene polymerization and, more particularly, to improve the technique for catalyst activation.

DISCLOSURE OF THE INVENTION

An object of this invention, therefore, is to provide a process for the activation of known ethylene polymerization catalysts, such as titanium or vanadium compounds, whereby an activated catalyst is prepared much more rapidly and simply than by following the route to the activated magnesium/titanium based catalyst composition heretofore discussed.

Other objects and advantages will become apparent hereafter.

According to the present invention, a process for activating a titanium or vanadium compound and producing polyethylene has been discovered comprising (i) dissolving a divalent magnesium halide and a Lewis acid having the formula $R_mAlX_n$ or $R_mBX_n$ wherein R is an alkyl or aromatic radical, each radical having 1 to 12 carbon atoms and each R being alike or different; X is a halogen atom; m is an integer from 0 to 3; and m+n equals 3, in an excess of electron donor compound selected from the group consisting of alkyl esters of alkyl and aromatic carboxylic acids and alkyl and cycloalkyl ethers, each compound having 2 to 12 carbon atoms, in such a manner that a magnesium halide/Lewis acid/electron donor complex is formed; (ii) separating the complex from excess electron donor compound; and (iii) introducing (a) the complex, the titanium or vanadium compound, and a hydrocarbyl aluminum compound and (b) ethylene into a reactor in such a manner that the titanium or vanadium compound is activated and polyethylene is produced.

DETAILED DESCRIPTION

Titanium or vanadium compounds of interest here are commonly used as catalyst components in the polymerization of ethylene. Typical titanium compounds have the formula $Ti(OR)_nX_{4-n}$ wherein R is a hydrocarbyl group having 1 to 14 carbon atoms or a COR' radical wherein R' is a hydrocarbyl group having 1 to 14 carbon atoms; X is a halide radical; and n is an integer from 0 to 4. Examples of titanium compounds are $TiCl_4$; $TiBr_4$; $TiI_4$; $Ti(OCH_3)Cl_3$; $Ti(OC_6H_5)Cl_3$; $Ti(OCOCH_3)Cl_3$; $Ti(OCOC_6H_5)Cl_3$; $Ti(OC_2H_5)Cl_3$; $Ti(OC_2H_5)_2Cl_2$; $Ti(OC_3H_7)_2Cl_2$; $Ti(OC_2H_5)_3Cl$; $Ti(OC_6H_5)_3Cl$, $Ti(OC_2H_5)_4$; $Ti(OC_3H_7)_4$; $Ti(OC_4H_9)_4$; $Ti(OC_6H_{13})_4$, $Ti(OC_6H_{11})_4$; $Ti(OC_8H_{17})_4$; $Ti(OCH_2(C_2H_5)CHC_4H_9)_4$; $Ti(OC_9H_{19})_4$; $Ti[OC_6H_3(CH_3)_2]_4$; $Ti(OCH_3)_2(OC_4H_9)_2$; $Ti(OC_3H_7)_3(OC_4H_9)$; $Ti(OC_2H_5)_2(OC_4H_9)_2$; $Ti(OC_2H_4OCH_3)_4$; and $Ti(OC_2H_4Cl)_4$. Examples of vanadium compounds are $VCl_4$, $VCl_3$, $VOCl_3$, triisobutyl vanadate, and vanadium tris-acetyl acetonate. Other suitable vanadium compounds are mentioned in U.S. Pat. Nos. 3,956,255 and 4,370,455, both incorporated by reference herein.

The electron donor solvents used in the process are organic compounds, liquid at temperatures in the range of about 0° C. to about 200° C., in which the magnesium halide and defined Lewis acids are soluble. The electron donor solvents are also known as Lewis bases.

The electron donor compounds are selected from the group consisting of alkyl esters of alkyl and aromatic carboxylic acids and alkyl and cycloalkyl ethers, each compound having 2 to 12 carbon atoms. Among these electron donor compounds the preferable ones are alkyl esters of saturated alkyl carboxylic acids having 1 to 4 carbon atoms; alkyl esters of aromatic carboxylic acids having 7 or 8 carbon atoms; alkyl ethers having 2 to 8 carbon atoms, preferably 4 or 5 carbon atoms; and cycloalkyl ethers having 4 or 5 carbon atoms; preferably mono- or di-ethers having 4 carbon atoms. The most preferred of these electron donor compounds include methyl formate, ethyl acetate, butyl acetate, ethyl ether, tetrahydrofuran, and dioxane. Other examples of electron donor compounds are di-n-propyl ether, dibutyl ether, ethyl formate, methyl acetate, ethyl anisate, ethylene carbonate, tetrahydropyran, and ethyl propionate.

The divalent magnesium halide can be represented by the formula $MgX_2$ wherein X is selected from the group consisting of Cl, Br, and I.

Suitable magnesium compounds include $MgCl_2$, $MgBr_2$, and $MgI_2$. Anhydrous $MgCl_2$ is particularly preferred.

The Lewis acids are, as noted above, those having the formula $R_mAlX_n$ or $R_mBX_n$ wherein R is an alkyl or aromatic radical, each radical having 1 to 12 carbon atoms and each R being alike or different; X is a halogen atom; M is an integer from 0 to 3; n is an integer from 0 to 3; and m+n equals 3. Examples of alkyl radicals are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, and dodecyl. Example of aromatic radicals are: phenyl, phenethyl, methoxyphenyl, benzyl, tolyl, xylyl, naphthyl, naphthal, and methylnaphthyl. Examples of halogens are chlorine, bromine, and iodine.

Preferred Lewis acids are $AlCl_3$, $C_2H_5AlCl_2$, $(C_2H_5)_2AlCl$, $(C_2H_5)_3Al$, and $BCl_3$. Other examples of suitable Lewis acids are triisobutyl aluminum, tributylaluminum, dibutylaluminum chloride, diethylaluminum bromide, propylaluminum dichloride, butylaluminum dibromide, $Al(C_6H_{13})_3$, $Al(C_8H_{17})_3$, trimethylaluminum, diisobutylaluminum chloride, isobutylaluminum dichloride, diethylaluminum methoxide, diethylaluminum ethoxide, dimethylaluminum chloride, and methylaluminum dichloride.

The magnesium halide/Lewis acid/electron donor complex, which may also be referred to as an adduct or solvated adduct, is formed when the divalent magnesium halide is dissolved in an electron donor together with a Lewis acid at a temperature in the range of about 0° C. to about 200° C. The molar ratio of magnesium halide to Lewis acid can be in the range of about 0.1 mole to about 4 moles of magnesium halide to one mole of Lewis acid and is preferably in the range of about 0.5 mole to about 2 moles of magnesium halide to one mole of Lewis acid. An excess of electron donor compound, i.e., a number of moles of electron donor compound at least about 15 times greater than the total number of moles of magnesium halide and Lewis acid combined, provides a sufficient number of moles of electron donor to yield the complex. While atmospheric pressure is generally used, pressure is not considered a significant factor. These solvated adducts can be isolated by evaporation of excess solvent or by slow crystallization of the adduct after partial concentration of the solvent. Preferred complexes are derived from $MgCl_2$ and the Lewis acids $AlCl_3$, $C_2H_5AlCl_2$, $(C_2H_5)_2AlCl$, $(C_2H_5)_3Al$, and $BCl_3$. These complexes are as follows: $MgCl_2.2AlCl_3.nTHF$, $MgCl_2.2AlCl_3.nEtOAC$, $MgCl_2.2EADC.nTHF$, $MgCl_2.2BCl_3.6EtOAC$, $MgCl_2.EADC.nTHF$, $MgCl_2.2EADC.nEtOAC$, $2MgCl_2.TEAL.nTHF$, wherein n can be an integer from 1 to 13 and is preferably an integer from 5 to 12. The integer represents the number of moles of electron donor compound.

The following acronyms are used above and throughout this specification:
EADC=ethylaluminum dichloride
THF=tetrahydrofuran
TEAL=triethylaluminum
EtOAC=ethyl acetate
DEAC=diethylaluminum chloride Analyses of six of the complexes are set forth in Table I.

TABLE I

| Complex | Analyses (weight %) | | | Analyzed Molar Stoichiometries | | |
|---|---|---|---|---|---|---|
| | Mg | Al | B | Mg | Al | B |
| $MgCl_2.2AlCl_3.$ nTHF | 2.14 | 5.46 | — | 1 | 2.27 | — |
| $MgCl_2.2EADC.$ nTHF | 2.74 | 6.71 | — | 1 | 2.20 | — |
| $MgCl_2.2EADC.$ nTHF | 4.44 | 5.25 | — | 1 | 1.06 | — |
| $2MgCl_2.TEAL.$ nTHF | 6.48 | 3.56 | — | 2.02 | 1 | — |
| $MgCl_2.2 BCl_3.$ 6EtOAC | 3.01 | — | 2.79 | 1 | — | 2.04 |
| $MgCl_2.2EADC.$ nEtOAC | 2.42 | 5.57 | — | 1 | 2.07 | — |

The family of subject complexes is found to activate titanium or vanadium compounds, particularly titanium tetrachloride, in the presence of a hydrocarbyl aluminum compound as a cocatalyst, in ethylene gas phase or slurry polymerization reactions. A catalyst, prepared by slurrying one of these complexes with titanium tetrachloride in hexane (or another inert hydrocarbon solvent), followed by washing with excess hexane and drying under reduced pressure possesses excellent activity in hexane polymerization reactions employing triethyl aluminum as a cocatalyst.

The hydrocarbyl aluminum cocatalyst can be represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be alike or different; and each R, which is a hydrocarbyl radical, has 1 to 20 carbon atoms, and preferably 1 to 10 carbon atoms. Further, each alkyl radical can be straight or branched chain and such hydrocarbyl radical can be a mixed radical, i.e., the radical can contain alkyl, aryl, and/or cycloalkyl groups. Examples of suitable radicals are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, naphthal, methylnaphthyl, cycohexyl, cycloheptyl, and cyclooctyl.

Examples of hydrocarbyl aluminum compounds are as follows: triisobutylaluminum, trihexylaluminum, di-isobutylaluminum hydride, dihexylaluminum hydride, isobutylaluminum dihydride, hexylaluminum dihydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. The preferred hydrocarbyl aluminums are triethylaluminum, triisobutylaluminum, trihexylaluminum, di-isobutylaluminum hydride, and dihexylaluminum hydride.

These complexes also activate titanium or vanadium compounds when the complex is first impregnated on a silica support. The purpose of the impregnation is to produce polymers of preferred shape and bulk density. To achieve this end, the magnesium halide and Lewis acid are dissolved in the electron donor solvent and slurried with the silica support. The excess solvent is then removed by purging or evaporation under reduced pressure. The resulting impregnated complexes are slurried with, for example, the tetravalent titanium compound in hexane, followed by washing with excess hexane and drying, as above. These impregnated catalysts are also found to be active with triethyl aluminum as a cocatalyst. The result of the copolymerization is not only high catalyst activity, but high bulk density as well.

Further, it is found that the solubility of the divalent magnesium halide in the electron donor solvent is increased by the presence of the defined Lewis acid, e.g., the degree of solubility of $MgCl_2$ in tetrahydrofuran is increased 100 percent by using a 0.6 molar solution of triethylaluminum in tetrahydrofuran.

Conductivity experiments measure the ability of a solution to carry a charge across a fixed path between two electrodes. If the bonding interaction between the magnesium halide and the Lewis acid in the electron donor solvent is ionic then a significant increase in conductivity over each component alone in the electron donor solvent should occur. The results of a series of conductivity experiments indicate just such an increase and it is therefore concluded that the subject complex is ionic in character. Since the conductive capacity is reached almost immediately upon mixing the components, there apparently is no kinetic barrier to interaction of the magnesium halide and Lewis acid in the electron donor solvent.

Impregnation of subject complex into, for example, silica prior to its use in titanium or vanadium compound activation is desirable to provide improved particle morphology. The impregnation is accomplished by mixing the complex and silica gel in the electron donor solvent followed by solvent removal under reduced pressure. Ethylene polymerization reactions are run by either slurrying the silica gel supported complex with the tetravalent titanium compound or isolating the impregnated silica gel after treatment with the tetravalent titanium compound, and then using the slurry or isolated precursor in the polymerization reaction. It is found that the levels of catalyst activity, resin properties, and bulk densities compare favorably with catalysts exemplified by the reaction product of magnesium dichloride/titanium tetrachloride/tetrahydrofuran and triethyl aluminum.

The invention is illustrated by the following examples:

Complexes are formed when magnesium dichloride and a defined Lewis acid are dissolved in an excess of electron donor solvent. The solvated complex is isolated by evaporation of excess solvent or slow crystallization after partial evaporation of the solvent. The complex is either (1) slurried with titanium tetrachloride in hexane to form a precursor, which is then isolated, or (2) slurried with titanium tetrachloride in hexane just prior to introduction into the polymerization reactor.

EXAMPLE 1

The complex $MgCl_2/2EADC/THF$ is prepared as follows: to a flask is added 1.93 grams (15 millimoles) of ethylaluminum dichloride. After chilling to 0° C., one cubic centimeter of THF is added and the solid dissolves immediately. After warming to room temperature, 9 cubic centimeters of 0.51 molar $MgCl_2$ in THF is added and a white precipitate forms immediately. The mixture is warmed to 40° C. and all of the solid dissolves. Upon cooling to ambient temperature, the precipitate reforms. The mixture is cooled to 0° C. and the mother liquor is decanted away. The residue is then washed with cold THF and dried under high vacuum.

Analysis of complex:
6.71% by weight aluminum
2.74% by weight magnesium

Proton nuclear magnetic resonance ($CH_2Cl_2$, chemical shift in parts per million): minus 0.15 quartet; 0.83 triplet; 1.80 multiplet, 3.90 multiplet. This spectrum is uniquely different from any of the starting materials.

EXAMPLE 2

The complex $MgCl_2/EDAC/THF$ is prepared as follows: to a flask is added 1.94 grams (15 millimoles) of ethyl aluminum dichloride. After cooling the flask to 0° C., 13.3 cubic centimeters of 0.52 molar $MgCl_2$ (6.9 millimoles) in THF is added. The solution is concentrated to 5 cubic centimeters and a crop of crystals is collected by decanting away the mother liquor. The mother liquor is allowed to stand and a second crop of crystals is collected.

Analysis of complex (second crop of crystals):
5.25% by weight aluminum
4.44% by weight magnesium Infrared spectrum (Nujol mull; $cm^{-1}$), ether absorptions only: 1025; 1015; 875; 862; 848. As in example 1, this spectrum is uniquely different from any of the starting materials.

EXAMPLE 3

The complex $MgCl_2/2EADC/EtOAC$ is prepared as follows: to a flask is added 1.9 grams (15 millimoles) of ethyl aluminum dichloride with 8 cubic centimeters of 0.52 molar $MgCl_2$ in EtOAC. A precipitate forms immediately. The mixture is warmed and allowed to cool slowly. A white solid forms and is collected by decanting away the mother liquor. The remaining solid is cooled and washed two times with cold EtOAC.

Analysis:
2.42% by weight magnesium
5.57% by weight aluminum $H^1NMR$ (nuclear magnetic resonance) spectrum ($CH_2Cl_2$, chemical shift in parts per million); minus 0.05 quartet; 0.95 triplet; 1.17 triplet; 2.14 singlet; 4.14 quartet.

This spectrum is also uniquely different from any of the starting materials.

EXAMPLE 4

The complex $MgCl_2/2BCl_3/EtOAC$ is prepared as follows: to a flask are added equal volumes of 0.13 molar $MgCl_2$ and $BCl_3$ solutions in ethyl acetate. A white precipitate forms immediately and is isolated by filtration.

Analysis:
3.01% by weight magnesium
2.79% by weight boron
34.7% by weight chlorine

EXAMPLES 5 TO 8

The catalyst in examples 5 to 8 is prepared by isolating an adduct formed by slurrying the complex with an excess of $TiCl_4$ in hexane. The titanium derivative is isolated by decanting away the hexane solution and washing the residue with excess hexane. Additional steps, conditions, and results will be found below and in Table II.

EXAMPLE 9

The complex is slurried with 7 milligrams of $TiCl_4$ just prior to addition to the polymerization reaction. Additional steps, conditions, and results will be found below and in Table II.

EXAMPLES 10 AND 11

(a) To a flask is added 12.67 grams of silica, which has been dried under a nitrogen purge at 800° C. To the silica is added 75 cubic centimeters of THF followed by 5.9 cubic centimeters of 1.5 molar EADC in hexane (8.85 millimoles). Next, 8.5 cubic centimeters of 0.52 molar $MgCl_2$ in THF is added. After stirring, the solvent is removed under reduced pressure.

(b) To a flask is charged 5.48 grams of the supported complex with 20 cubic centimeters of hexane. To this is added 0.35 millimoles of $TiCl_4$ per gram of supported complex. The mixture is stirred, allowed to settle, and the solvent is decanted away. The solid is washed three times with hexane, then dried under vacuum. Additional steps, conditions, and results will be found below and in Table II.

EXAMPLES 12 AND 13

Example 10 is repeated except that DEAC is substituted for EADC. Additional steps, conditions, and results will be found below and in Table II.

Each catalyst of examples 5 to 13 and TEAL as a cocatalyst are added to a reaction vessel containing 20 cubic centimeters of 1-hexene. Ethylene is introduced at an initial pressure of 0.89 megaPascal. Hydrogen is also introduced at 0.14 megaPascal. The reaction temperature is 85° C.

Table II sets forth the following conditions and results:

1. The isolated magnesium halide/Lewis acid/electron donor complex. Milligrams of catalyst are set forth in parentheses. In examples 10 to 13, this weight includes the support.
2. The method of titanium addition, i.e., (1) or (2) described above. In method (2), the milligrams of titanium added in examples 9, 11, and 13 are 7, 6.9, and 6.9, respectively.
3. The percentage of titanium in the catalyst.
4. Triethylaluminum is used as a cocatalyst. The mole ratio of triethylaluminum to titanium is given.
5. The activity of the catalyst in kilograms of polyethylene per millimole of titanium per hour at an ethylene pressure of one megaPascal.
6. Melt index: ASTM D-1238, Condition E. Measured at 190° C. and reported as grams per 10 minutes.
7. Melt flow ratio: Ratio of Flow Index to Melt Index. Flow index: ASTM D-1238, Condition F. Measured at 10 times the weight used in the melt index test above.
8. Polymer density: ASTM D-1505 procedure is followed for polymers having a density of less than 0.940 gram per cubic centimeter and a modified procedure is used for polymers having a density equal to or greater than 0.940 gram per cubic centimeter. For the low density polymers, a plaque is made and conditioned for one hour at 100° C. to approach equilibrium crystallinity. For the high density polymers, the plaque is conditioned for one hour at 120° C. to approach equilibrium crystallinity, and is then quickly cooled to room temperature. Measurement for density is then made in a density gradient column and density values are reported as grams per cubic centimeter.
9. Polymer bulk density: ASTM D-1895, Method B. The resin is poured via a ⅜ inch diameter funnel into a 400 milliliter graduated cylinder to the 400 milliliter line without shaking the cylinder, and weighed by difference. Density values are reported as kilograms per cubic meter.

TABLE II

| Complex | Method of Ti Addition | Percent Ti | TEAL/ Ti Mole Ratio | Activity kg/mmTi/ hr/mPa$C_2H_4$ | Melt Index | Melt Flow Ratio | Polymer Density g/cc | Polymer Bulk Density kg/m$^3$ |
|---|---|---|---|---|---|---|---|---|
| 5. $MgCl_2$.2EADC.THF (27.9) | (1) | 4.44 | 40 | 7.59 | 2.1 | 26 | 0.9455 | — |
| 6. $MgCl_2$.EADC.THF (18.3) | (1) | 7.53 | 40 | 4.90 | 0.83 | 24 | 0.9428 | — |
| 7. $MgCl_2$.2AlCl$_3$.THF (18.7) | (1) | 4.81 | 40 | 2.00 | — | — | 0.9436 | — |
| 8. 2$MgCl_2$.TEAL.THF (26.1) | (1) | 4.85 | 40 | 4.92 | 0.84 | 24 | 0.9442 | — |
| 9. $MgCl_2$.2EADC.EtOAC (50.9) | (2) | — | 40 | 1.49 | — | — | — | — |
| 10. $MgCl_2$.2EADC.THF (207) | (1) | 1.20 | 40 | 2.85 | 2.2 | 26 | 0.9493 | 290 |
| 11. $MgCl_2$.2EADC.THF (202) | (2) | — | 40 | 3.15 | 0.91 | 25 | 0.9452 | 290 |
| 12. $MgCl_2$.2DEAC.THF (210) | (1) | 1.47 | 40 | 1.86 | 1.6 | 25 | 0.9507 | 290 |
| 13. $MgCl_2$.2DEAC.THF (198) | (2) | — | 40 | 2.67 | 0.93 | 26 | 0.9485 | 290 |

We claim:

1. A process for activating a titanium or vanadium compound and producing polyethylene comprising (i) dissolving a divalent magnesium halide and a Lewis acid having the formula $R_mAlX_n$ or $R_mBX_n$ wherein R is an alkyl or aromatic radical, each radical having 1 to 12 carbon atoms and each R being alike or different; X is a halogen atom; m is an integer from 0 to 3; n is an integer from 0 to 3; and m+n equals 3, in an excess of electron donor compound selected from the group consisting of alkyl esters of alkyl and aromatic carboxylic acids and alkyl and cycloalkyl ethers, each compound having 2 to 12 carbon atoms, the ratio of the number of moles of electron donor to the total number of moles of magnesium halide and Lewis acid combined being at least about 15:1, in such a manner that a magnesium halide/Lewis acid/electron donor complex is formed; (ii) separating the complex from the excess electron donor compound; (iii) bringing the complex into contact with the titanium or vanadium compound in such a manner that an adduct is formed; and (iv) introducing (a) the adduct and a hydrocarbyl aluminum compound and (b) ethylene into a reactor in such a manner that the adduct is activated and polyethylene is produced.

2. The process defined in claim 1 wherein the halide is divalent magnesium chloride.

3. The process defined in claim 1 wherein the Lewis acid is selected from the group consisting of $AlCl_3$, $C_2H_5AlCl_2$, $(C_2H_5)_2AlCl$, $(C_2H_5)_3Al$, and $BCl_3$.

4. The process defined in claim 3 wherein the electron donor compound is selected from the group consisting of methyl formate, ethyl acetate, butyl acetate, ethyl ether, tetrahydrofuran, and dioxane.

* * * * *